(12) United States Patent
Rabipour et al.

(10) Patent No.: US 6,363,339 B1
(45) Date of Patent: Mar. 26, 2002

(54) DYNAMIC VOCODER SELECTION FOR STORING AND FORWARDING VOICE SIGNALS

(75) Inventors: Rafi Rabipour, Côte St. Luc (CA); Girish Patel, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/948,315

(22) Filed: Oct. 10, 1997

(51) Int. Cl.[7] .................... G10L 19/00; H04M 1/64; H04M 3/50
(52) U.S. Cl. ................. 704/201; 379/68; 379/88.16
(58) Field of Search .................. 704/201, 219, 704/226; 379/68, 88.16

(56) References Cited

U.S. PATENT DOCUMENTS

| | | | |
|---|---|---|---|
| 5,115,469 A | | 5/1992 | Taniguchi et al. |
| 5,134,647 A | | 7/1992 | Pugh et al. |
| 5,666,350 A | | 9/1997 | Huang et al. |
| 6,002,999 A | * | 12/1999 | Han et al. .............. 704/201 |
| 6,014,375 A | * | 1/2000 | Janky ................. 370/347 |
| 6,014,568 A | * | 1/2000 | Alperovich et al. ....... 455/456 |
| 6,134,521 A | * | 10/2000 | Kotzin .................. 704/226 |

FOREIGN PATENT DOCUMENTS

| | | |
|---|---|---|
| CA | WO 96/19907 | 6/1996 |
| WO | CA9519907 | 12/1995 |

OTHER PUBLICATIONS

Harry Newton, Newton's Telecom Dictionary, 10th edition, "In-Band Signaling," p. 592, Feb. 1996.*
European Search Report EP 98 20 3362.

* cited by examiner

Primary Examiner—Talivaldis Ivars Smits

(57) ABSTRACT

In recent years, the telecommunications industry has witnessed the proliferation of a variety of digital vocoders in order to meet bandwidth demands of different wireline and wireless communication systems. The rapid growth in the diversity of networks and the number of users of such networks is increasing the number of instances where two vocoders are placed in tandem to serve a single connection. Such arrangements of low bit-rate codecs can degrade the quality of the transmitted speech. To overcome this problem in the specific situation involving store-and-forward systems (e.g. voicemail), the invention provides a novel method and apparatus including a plurality of different vocoders that can be selectively invoked to process the voice signal so as to reduce signal degradation. Also, the apparatus has the capability to bypass the vocoder bank when exchanging data with a remote signal processor capable of accepting data frames in compressed format.

48 Claims, 6 Drawing Sheets

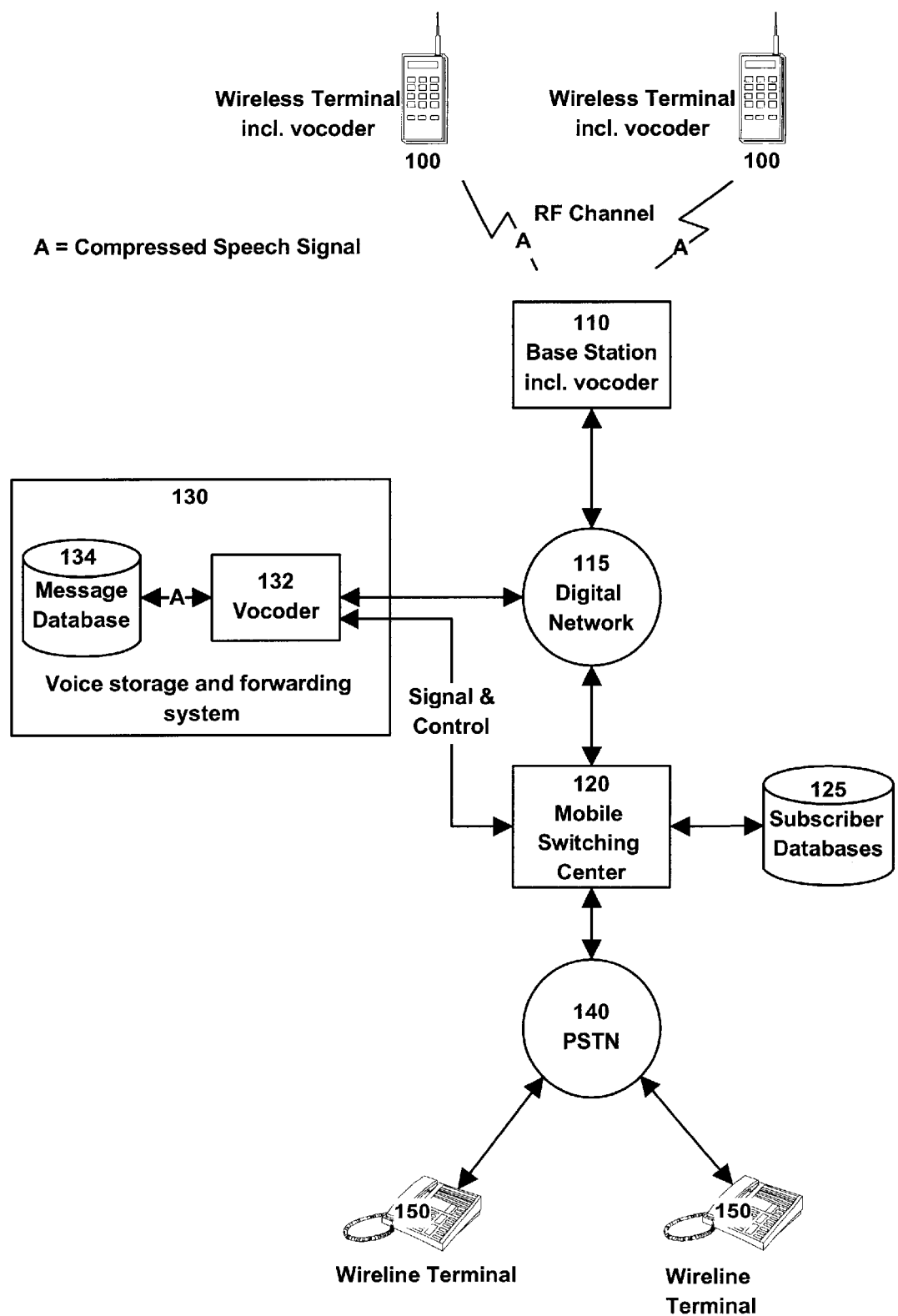

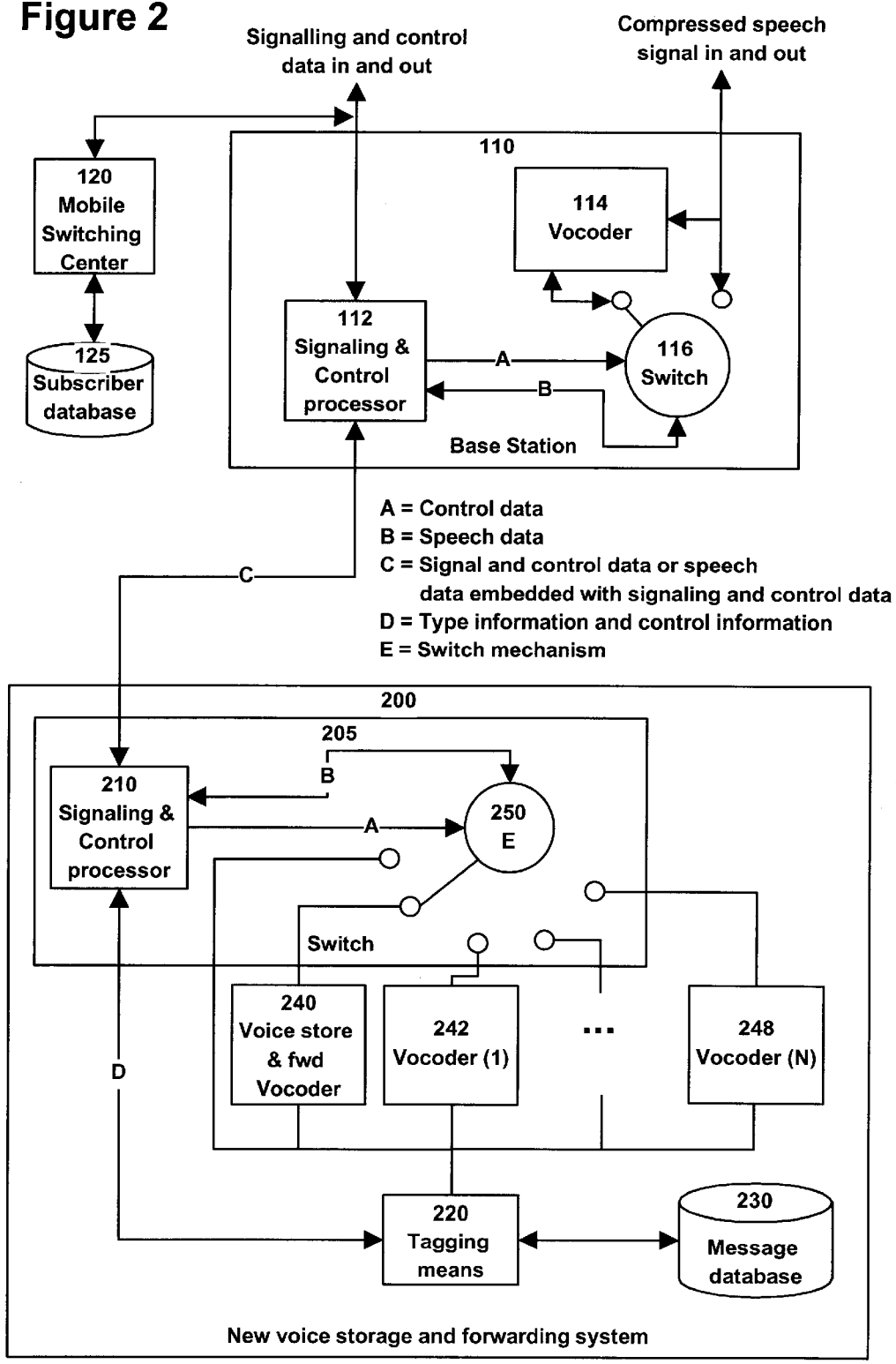

DYNAMIC VOCODER SELECTION FOR STORING AND FORWARDING VOICE SIGNALS

CROSS-REFERENCE TO RELATED APPLICATION(s)

The subject matter of the present application is related to that of concurrently-filed U.S. patent application Ser. No. 08/948,418, issued as U.S. Pat. No. 6,006,189 on Dec. 21, 1999.

FIELD OF THE INVENTION

This invention relates to a method and an apparatus for transmitting digitized voice signals, in a telecommunication environment in which the compression and decompression of voice signals is involved. More specifically, it relates to a method and an apparatus for improving the quality of an audio signal, which has been compressed or encoded with a digital signal processing technique, when the signal is stored or retrieved to or from a store-and-forward (e.g. voicemail) system in a telecommunication network.

BACKGROUND OF THE INVENTION

In recent years, the telecommunications industry has witnessed the proliferation of a variety of digital vocoders in order to meet bandwidth demands of different wireline and wireless communication systems. Vocoders are usually integrated in wireless telephones and the base stations of the communication network or a link therefrom. They provide speech compression of a digitized voice signal as well as the reverse transformation. Typically, a voice signal is digitized through one of many quantization techniques. An example of this technique is Pulse Code Modulation (PCM). For the purposes of this description, we will refer to PCM as the input format for the vocoder. Thus a vocoder includes an encoder stage that will accept as input a digitized voice signal and that will output a compressed signal, a possible compression ratio being 8:1. As for the reverse transformation the vocoder is provided with a decoder stage that will accept the compressed speech signal and that will output a digitized signal, such as PCM samples.

The main advantage of compressing speech is that it uses less of the limited available channel bandwidth for transmission. In voice messaging applications, it also minimizes storage memory requirements thereby increasing the number of subscribers that can be served. The main disadvantage is loss of speech quality specially when speech is subjected to multiple instances of vocoders.

The rapid growth in the diversity of networks and the number of users of such networks is increasing the number of instances where two vocoders are placed in tandem to serve a single connection. An example of such a situation is when a wireless user records a message to a voice storage and forwarding device and a wireline terminal then retrieves the message. In such a case, a first encoder is used to compress the speech at the terminal of the wireless user. The compressed speech is transmitted to a base station serving the local wireless terminal where it is decompressed (converted to PCM format samples). The resulting PCM samples are routed to the voice storage and forwarding device where a second encoder is used to compress the input signal for storage in a database. If the person who has access to the voice storage and forwarding device retrieves the message from a wireline terminal, a speech decoder in the voice storage and forwarding device decompresses the stored compressed speech data into PCM format for transmission to the wireline terminal over the PSTN.

The situation is even more complex when the user uses a wireless terminal to retrieve, from a voice storage and forwarding device, a message that was recorded by a wireless terminal user. In such a situation, the compression and decompression of speech occurs three times: once for the wireless terminal/base station combination, a second time in storing and retrieving the message in the voice storage and forwarding device, and finally, a third time in the last base station/wireless terminal combination. Yet another expanding area of concern is Internet telephony. Indeed, Internet telephony uses vocoders as well.

In an attempt to eliminate the condition of vocoder tandeming, a method called <<bypass>> has been proposed in the past. The basic idea behind this approach is the provision of a digital signal processor including a vocoder and a bypass mechanism that is invoked when the incoming signal is in a format compatible with the vocoder. In use, the digital signal processor associated with the first base station that receives the RF signal from a first wireless terminal determines, through signaling and control that an identical digital signal processor exists at the second base station associated with the wireless terminal at which the call is directed. The digital signal processor associated with the first base station rather than converting the compressed speech signals into PCM samples invokes the bypass mechanism and outputs the compressed speech in the transport network. The compressed speech signal, when arriving at the digital signal processor associated with the second base station is routed such as to bypass the local vocoder. Decompression of the signal occurs only at the second wireless terminal. The "bypass" approach is described in the international application serial number PCT/95CA/00704 dated Dec. 13, 1995. The contents of this disclosure are incorporated herein by reference.

However, the "bypass" solution described above was designed for the base station portion of the telecommunication network. This implies that it is useful only for the tandem situations in which a telecommunication link is established between two wireless users. Also, this solution is only valid for identical vocoders. With the diversity of vocoders quickly increasing, the bypass solution is only valid for a small portion of connections involving tandem vocoding.

Thus, there exists a need in the industry for devices capable of improving voice quality in other situations that involve vocoder tandeming such as in digital voice store-and-forward systems.

OBJECTS AND STATEMENT OF THE INVENTION

An object of the invention is to provide an apparatus for storage and forwarding of voice data that allows to reduce signal degradations as a result of successive signal compression/decompression cycles, particularly when non-compatible vocoders are used to effect the compression/decompression cycles.

Another object of the invention is to provide a method for storage and forwarding of voice data that allows to reduce signal degradations as a result of successive signal compression/decompression cycles, particularly when non-compatible vocoders are used to effect the compression/decompression cycles.

Another object of the invention is a communication system with voice storage and forwarding capability, designed to reduce signal degradations as a result of successive signal compression/decompression cycles, particularly when non-compatible vocoders are used to effect the compression/decompression cycles.

As embodied and broadly described herein, the invention provides a voice storage and forwarding device, comprising:

an input for receiving a digital signal that conveys audio information;

a group of vocoders;

a switch capable of acquiring a plurality of vocoder selection positions, in each vocoder selection position said switch directing the digital signal that conveys audio information received at said input to a selected one of said vocoders of said group of vocoders;

a storage medium in a data communicative relationship with said vocoders, said storage medium capable to store data that conveys audio information issued by a vocoder from said group of vocoders and transmit stored data that conveys audio information toward a selected one of said vocoders.

In this specification, the term "wireless terminal" is intended to include both mobile terminals and fixed wireless terminals. The term "wireless terminal" is part of a larger family of terminals that we call "speech compression terminals". These terminals usually include vocoders that are capable of converting speech from a digitized format to a compressed format and vice versa. Other examples of these terminals are those used for Internet telecommunications, Integrated Services Digital Network (ISDN) terminals, etc. This disclosure is therefore meant to include all terminals capable of converting speech from a digitized format to a compressed format and vice versa.

The expression "data frame" will refer to a group of bits organized in a certain structure or frame that conveys some information. Typically, a data frame when representing a segment of audio signal in compressed form will include a coefficients segment and an excitation segment. The data frame may also include additional elements that may be necessary for the intended application.

The expressions "first format", "second format", etc. when used to describe the audio signal in compressed form in the format of a given vocoder, refers to signals in compressed form that are, generally speaking, not compatible with each other, although they may share a common basic structure. For example, such signals may be divided into a coefficient segment and an excitation segment. Thus, a vocoder capable of converting a signal under the first format will not, generally speaking, be capable of processing a signal expressed under any other format than the first format.

In this specification, the term "coefficient segment" is intended to refer to any set of coefficients that uniquely defines a filter function which models the human vocal tract. It also refers to any type of information format from which the coefficients may indirectly be extracted. In conventional vocoders, several different types of coefficients are known, including reflection coefficients, arcsines of the reflection coefficients, line spectrum pairs, log area ratios, among others. These different types of coefficients are usually related by mathematical transformations and have different properties that suit them to different applications. Thus, the term "coefficient segment" is intended to encompass any of these types of coefficients.

The "excitation segment" can be defined as information that needs to be combined with the coefficients segment in order to provide a complete representation of the audio signal. It also refers to any type of information format from which the excitation may indirectly be extracted. The excitation segment complements the coefficients segment when synthesizing the signal to obtain a signal in a non-compressed form such as in PCM sample representations. Such excitation segment may include parametric information describing the periodicity of the speech signal, an excitation signal as computed by the encoder of a vocoder, speech framing control information to ensure synchronous framing in the decoder associated with the remote vocoder, pitch periods, pitch lags, gains and relative gains, among others.

In a most preferred embodiment, the voice store and forward system includes a plurality of vocoders of different types. When a transaction for recording a message is being set, the telecommunication network derives, from a user's profile database, the "user preferred" vocoder for a particular user and transmits an identifier to the voice store and forward system. If there is no user preference, the voice store and forward system will select a default vocoder. On the basis of this identifier, the switch will assume the appropriate vocoder selection position such that the incoming audio information, in PCM format, will be converted into compressed format by a user determined or default vocoder type. Typically, the "user preferred" vocoder type will be the same as the vocoder type of the user's mobile or fixed wireless terminal. This configuration enhances speech quality.

The voice storage and forwarding system includes tagging means that attach or associate some sort of vocoder type designator to the audio data in compressed format that is stored on the storage medium. The vocoder type designator is an identifier that uniquely identifies the vocoder used for compressing the stored speech signal. This information is used to allow the system to select the proper decoder when the audio information is to be converted into decompressed format. The vocoder type designator can be stored with the individual data frames in the storage medium or it can be collected separately from the data frames.

As embodied and broadly described herein, the invention also provides a communication system, comprising:

a database storing a plurality of vocoder type identifiers;

a voice storage and forwarding device;

a data transmission pathway between said database and said voice storage and forwarding device, said voice storage and forwarding device including:

a) an input for receiving a digital signal that conveys audio information;

b) a group of vocoders;

c) a switch capable of acquiring a plurality of vocoder selection positions, in each vocoder selection position said switch directing the digital signal that conveys audio information received at said input to a selected one of said vocoders of said group of vocoders, said switch being responsive to a vocoder type identifier issued by said database and forwarded to said voice storage and forwarding device on said data transmission pathway to acquire a vocoder selection position indicative by the vocoder type identifier issued by said database;

d) a storage medium in a data communicative relationship with said vocoders, said storage medium capable to store data that conveys audio information issued by a vocoder from said group of vocoders and transmit stored data that conveys audio information toward a selected one of said vocoders.

As embodied and broadly described herein, the invention also provides a method for storing data containing audio information, said method comprising the steps of:

providing a group of vocoders;
providing a switch capable of acquiring a plurality of vocoder selection positions, in each vocoder selection position said switch directing data containing audio information to a selected one of said vocoders of said group of vocoders;
providing a storage medium in a data communicative relationship with said vocoders, said storage medium capable to store data containing audio information issued by a vocoder from said group of vocoders;
setting said switch to a selected vocoder selection position to permit transfer of data containing audio information toward a vocoder from said group of vocoders corresponding to the position of said switch.

As embodied and broadly described herein, the invention also provides a voice storage and forwarding device, comprising:
an input for receiving a digital signal that conveys audio information;
at least one vocoder;
a switch capable of acquiring at least two operative positions, namely a vocoder selection position and a bypass position, in said vocoder selection position said switch directing the digital signal that conveys audio information received at said input to said vocoder;
a storage medium in a data communicative relationship with said vocoder and with said switch, said storage medium capable to store data that conveys audio information issued by said vocoder and transmit stored data that conveys audio information toward said vocoder;
in said bypass position said switch bypassing said vocoder and directing the digital signal that conveys audio information received at said input toward said storage medium.

In a most preferred embodiment, the switch of the voice storage and forwarding system is responsive to a control message, conveyed through in-band signaling, to acquire the bypass position. Typically, such control message will be issued by another bypass capable digital signal processor with whom audio information is being exchanged. In a specific example, consider the situation where a user leaves a voice message by using a wireless terminal. During the message recording transaction, the digital signal processor at the base station or base station controller assigned to the mobile terminal will issue a control message to the switch in the voice storage and forwarding device. As mentioned earlier, this control message is sent via in-band signaling. The control information contains a portion that identifies the digital signal processor and which is intended to convey the information that in fact this digital signal processor is bypass capable. When the switch receives this control message, it extracts the identification portion and through a simple database seeking operation determines that the source of the message has a bypass capability. The switch then issues an acknowledgement message, also by using in-band signaling, that also contains an identification portion. This acknowledgement message, when received by the digital signal processor at the base station is decoded and on the basis of the identifier contained therein knowledge is derived to the effect that the source of the acknowledgement message is bypass capable. At this point, the digital signal processor in the base station or base station controller and the switch in the voice storage and forwarding device acquire the bypass mode allowing transmission of data packets without any processing by a vocoder.

As embodied and broadly described herein, the invention also comprises a communication system, comprising:
a base station or base station controller including a digital signal processor;
a voice storage and forwarding device;
a data transmission pathway between said base station and said voice storage and forwarding device, said voice storage and forwarding device including:
a) an input for receiving a digital signal that conveys audio information;
b) at least one vocoder;
c) a switch capable of acquiring at least two operative positions, namely a vocoder selection position and a bypass position, in said vocoder selection position said switch directing the digital signal that conveys audio information received at said input to said vocoder;
d) a storage medium in a data communicative relationship with said vocoder and with said switch, said storage medium capable to store data that conveys audio information issued by said vocoder and transmit stored data that conveys audio information toward said vocoder;
e) in said bypass position said switch bypassing said vocoder and directing the digital signal that conveys audio information received at said input toward said storage medium;
f) said switch being responsive to a control message issued by said digital signal processor and forwarded to said voice storage and forwarding device on said data transmission pathway to acquire said bypass position.

As embodied and broadly described herein, the invention also provides method for storing data containing audio information, said method comprising the steps of:
providing a vocoder;
providing a switch capable of acquiring either one of a vocoder selection position and a bypass position, in said vocoder selection position said switch directing data containing audio information to said vocoder;
providing a storage medium in a data communicative relationship with said vocoder, said storage medium capable to store data containing audio information issued by said vocoder;
in said bypass position said switch bypassing said vocoder and directing the data containing audio information toward said storage medium;
setting said switch to a selected one of a vocoder selection position and bypass position to permit transfer of data containing audio information to said storage device.

BRIEF DESCRIPTION OF THE DRAWINGS

FIG. 1 is a block diagram depicting a partial view of a telecommunication network;

FIG. 2 is a block diagram of a system constructed in accordance with the present invention;

DESCRIPTION OF A PREFERRED EMBODIMENT

Figure 3A:
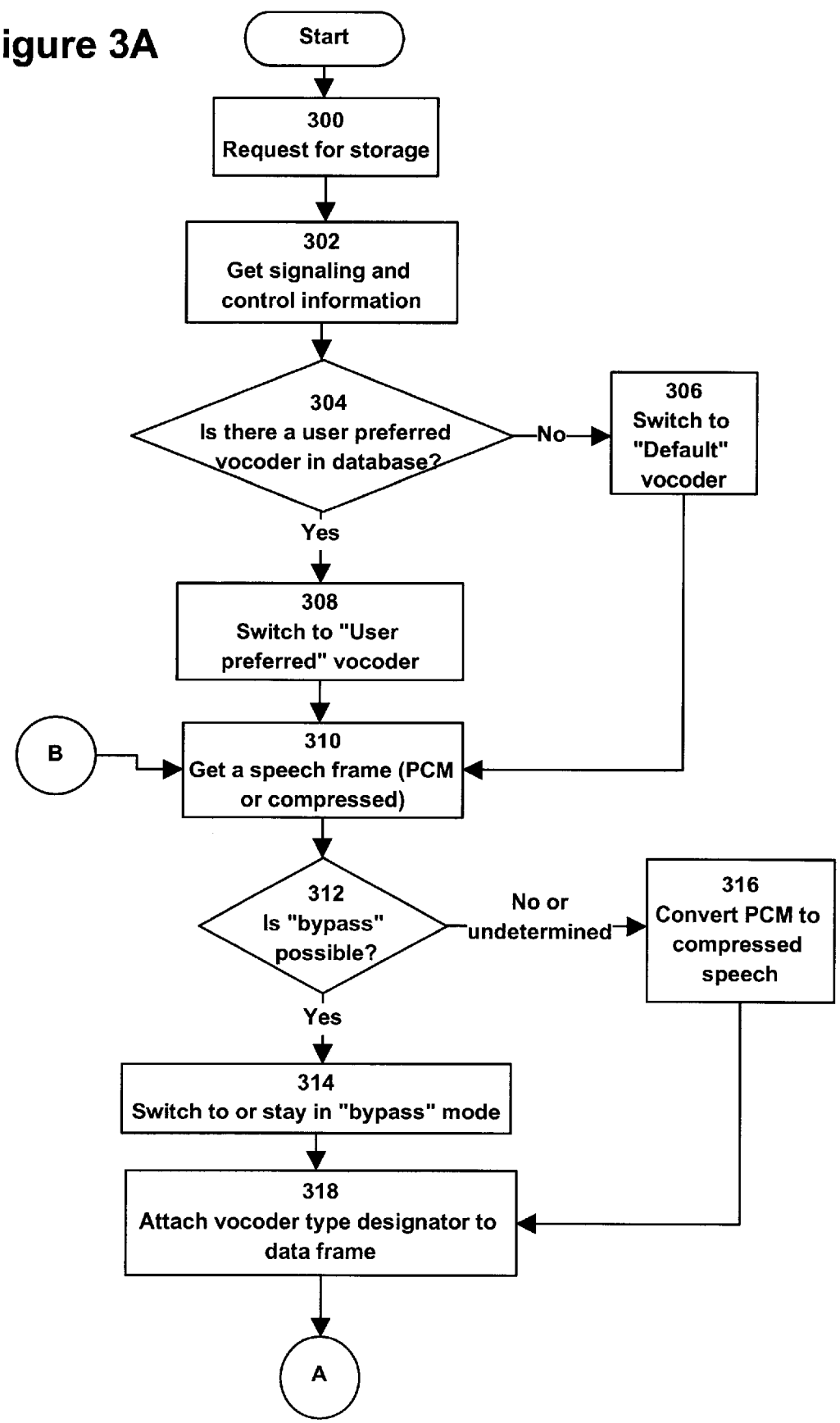
FIG. 3 is a flow chart describing the procedure for storing a message in the voice storage and forwarding device in accordance with the invention.

In telecommunications applications where channel bandwidth is at a premium, it is essential to use the smallest possible portion of a transmission channel. A common solution is to compress, with a vocoder, the voice signal before it is transmitted. This is also true of voice storage and forwarding systems.

Typically, the voice signal is first digitized at a specified rate (8 kHz is common) and quantized into discrete values for representation in digital format.

Codecs, which include an encoding and a decoding stage, are then used to compress (and decompress) the digital signals at the source and destination point, respectively, in order to optimize the use of transmission channels. Codecs used specifically for voice signals are called <<vocoders>> (for "voice coders"). By encoding only the necessary characteristics of a speech signal, fewer bits need to be transmitted than what is required to reproduce the original waveform in a manner that will not significantly degrade the speech quality. With fewer bits required, lower bit rate transmission can be achieved.

A particular problem is present when vocoders are in a tandem configuration where speech is put through the compression and decompression algorithms of vocoders more than once. When vocoders are tandemed in such a manner more degradation results. Such a situation is described below and shown in FIG. 1.

FIG. 1 is a block diagram depicting a partial view of one example of a telecommunication network. It is not the only network to which this invention applies and therefore should not be considered as limiting the scope of the invention. An example of the storage and retrieval of a voice message in a voice storage and forwarding device follows. A wireless user initiates a call and he wishes to leave a message in the voice storage and forwarding device of the called party. Firstly, the proper signaling and control is established and the Mobile Switching Center 120 will send the necessary instructions through the Digital Network 115 switches to establish a pathway in order to get the speech signal to the voice storage and forwarding device 130. Secondly, speech is compressed (encoded) by a vocoder located in wireless terminal 100 and sent via a wireless link (RF channel) to a base station 110 where it is decoded into PCM samples by the decoder of a second vocoder. The signal is then directed, through various switches in the digital network of the telecommunication company network 115 to the voice storage and forwarding device 130. The speech signal will then be encoded by the vocoder 132 of the voice storage and forwarding device and stored in a message database 134 according to the database digital format.

When the voice storage and forwarding device user wants to retrieve his message the following occurs. (Note that for this example, the user will retrieve the message from a wireline terminal 150.) Again, signaling and control first establishes the proper connection for the speech signal to travel. Then, the voice storage and forwarding device message database 134 is accessed and the user requests to retrieve his message. The speech signal leaves the message database in a compressed form and is converted to PCM by vocoder 132. The speech signal then travels through the Digital Network 115, the mobile switching center 120, the Public Switched Telephone Network (PSTN) 140 and finally reaches the wireline terminal 150 after conversion to analog format. In such a scenario, speech is compressed and decompressed twice.

Another example of tandem vocoding (compress/decompress twice) is a situation where a wireless terminal is communicating with another wireless terminal 100.

Yet another stage of vocoding may be added to the first example described above. Indeed, a third stage of vocoding will be present when the voice storage and forwarding device user is retrieving his message from a wireless terminal. In this case, signaling and control first establishes the proper connection for the speech signal to travel. Then, the voice storage and forwarding device message database 134 is accessed and the user requests to retrieve his message. The speech signal leaves the message database 134 in a compressed form and is converted to PCM by vocoder 132. The speech signal then travels through the Digital Network 115 and is sent to the base station 110 where it will be converted to a compressed format. Finally, the speech signal travels over the RF channel to reach the wireless terminal 100 where it will be converted a final time to PCM format.

To prevent degradations of the speech signal caused by tandemed connections of codecs (vocoders), a method called <<bypass>> was developed to eliminate the double decoding/encoding performed by vocoders in base stations during a call involving two wireless terminals.

The present invention provides a novel method and system for reducing the signal degradation that occurs when vocoders are connected in tandem during storage and retrieval of digitized voice signals. The system features mechanisms and protocols for determining the most suitable algorithm for compression/decompression of the voice signal in such situations.

FIG. 2 shows a block diagram of a system constructed in accordance with the present invention. The following paragraphs describe the invention in a specific network setting. It is not the only network to which this invention applies and therefore should not be considered as limiting the scope of the invention. This invention applies to any voice store and forwarding device that uses a compressed form of speech. For example, it applies to Internet telephony.

FIG. 2 shows a base station 110, which is existing in the telecommunication network and that, in this case, has the "bypass" capability incorporated, and the new voice storage and forwarding device 200. The base station 110 has a signaling and control processor 112 to exchange signal and control information with other elements of the telecommunication network, a vocoder 114 to encode and decode speech frames and a switch 116 which, under the control of the signaling and control processor 112, enables the choice between the vocoding function and the "bypass" function.

The voice storage and forwarding device 200 has a switch 205, which includes a signaling and control processor 210 to exchange signal and control information with other elements of the telecommunication network and a switch mechanism 250 which, under the control of the signaling and control processor 210, enables the choice between one of the possible vocoding functions and the "bypass" function. The voice storage and forwarding device 200 further has a tagging means 220 that attaches a vocoder type designator that identifies the vocoder that last converted the speech frame, a message database 230 to store the compressed speech frames and a group of vocoders 240 to 248 to encode and decode speech frames in the first to $N^{th}$ format.

The reason for offering a choice of vocoders is to avoid the possibility of signal degradation in circumstances when a tandem connection is established. The degradation of the signal is less severe when identical, or at least compatible, vocoders effect the successive compression/decompression cycles, than if non-compatible vocoders types are used. Thus, the "preferred vocoder" setting for a particular user should be the type of vocoders that is used in the wireless terminal from which the messages will be retrieved.

The following describe the signal flow in the Base station and voice storage and forwarding device combination.

Figure 3B:
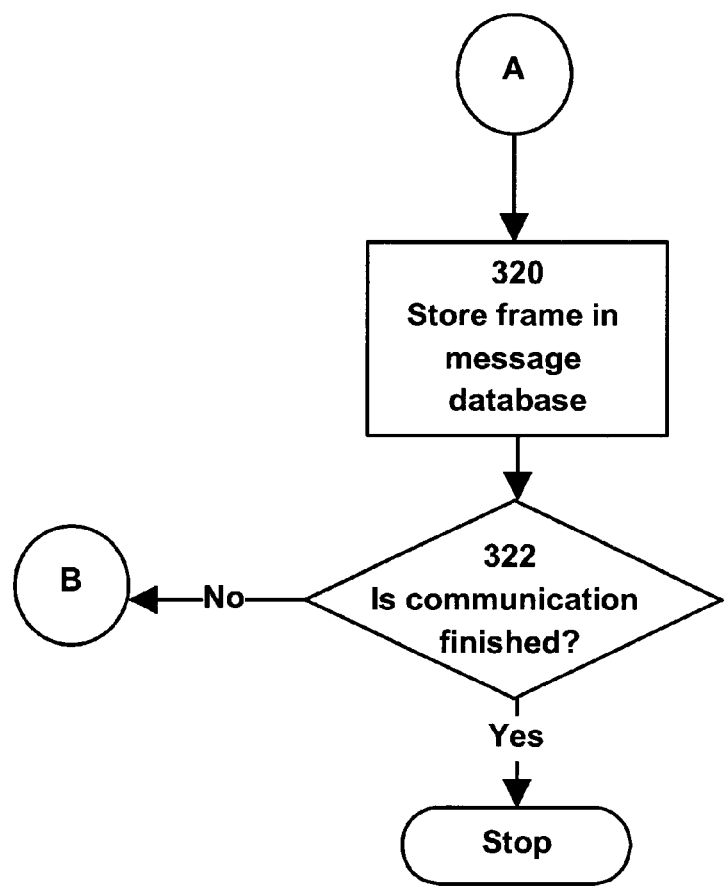

FIG. 3 is a flow chart describing the procedure, which is implemented by the voice storage and forwarding device 200 when a message is to be stored in the message database 230. A caller first makes a request for storage 300 (in fact, the system asks him if this is what he wishes to do) and then signaling and control information is exchanged 302 between all components involved in the call, namely the wireless terminal 100, the base station 110, the mobile switching center 140, and the voice storage and forwarding device 200. In the base station 110 this signaling and control information is handled by the signaling and control processor 112 and in the voice storage and forwarding device 200 it is handled by the signaling and control processor 210. These signaling and control processors interpret the signal and control data packets, which are sent to them under the control of mobile switching center 120 to find out if there is a user preferred vocoder from a database search operation 304. If it is determined that there is no user preferred vocoder 306, the signaling and control block 210 sends a signal to the switch mechanism 250 to select the voicemail's own vocoder (default). If there is a user preference 308, the signaling and control block 210 sends a signal to inform the voice store and forwarding device and it will select the user-preferred vocoder 242 to 248, if it is available.

User preference is determined upon initialization of the mailbox by the voice storage and forwarding device subscriber. This information is stored in the subscriber database 125. This database could be organized as a table, where a vocoder identifier, which designates the "user preferred terminal" type, is stored for each user. When the transaction for message storage is initiated, the vocoder identifier corresponding to the specific mailbox is retrieved, along possibly with other data, from the database 125 and sent to the switch 200. The signaling and control processor 210 interprets the received control information and sets the switch mechanism 250 to the vocoder selection position that corresponds to the vocoder identifier received from the database. In a situation where, in the database 125 for a particular user, no vocoder identifier exists, the signaling and control processor can be set to adopt a default position, selecting a given vocoder that is the default vocoder.

Once the user preferred or default vocoder has been invoked, the system is ready to get a first speech frame 310. After the voice storage and forwarding device starts receiving speech frames, it will go through the "bypass" capability determination loop 312. This is done as described below.

The basic idea behind the "bypass" method is that base station 110, knowing through signaling and control, that the vocoder in wireless terminal 100 is identical with one of the vocoders in the voice storage and forwarding device 200, bypasses the vocoder by selecting the corresponding switch 116 position, thus allowing the signal data frames to pass directly in the digital network 120 without being altered. Similarly, the voice storage and forwarding device 200, knowing that it receives compressed speech data frames, simply transmits the signal to its message database 230, without any coding, by selecting 314 the corresponding switch mechanism 250 position.

For signaling and control, the process of bit stealing is used during PCM signal transmission. This process consists of utilizing certain bits from certain speech samples to transmit signaling information. The location of the signaling bits and the bit robbing rate are selected to reduce the perceptual effect of the bit substitution, such that the audible signal at either one of the wireless terminals is not significantly affected. The receiving vocoder knows the location of the signaling bits in the speech samples and it is thus capable of decoding the message.

More specifically, when in message storage mode, the handshaking procedure between the base station 110 and the voice storage and forwarding device 200 involves the exchange of different messages such that every unit can be set in a mode allowing to produce the best possible speech quality. The handshaking procedure involves the exchange of the following messages:

a) the signaling and control processor 112 embeds an identifier in the PCM speech signal issued by the vocoder 114. This identifier enables the new voice storage and forwarding device 200 to precisely determine the originating terminal and its capabilities. For example, it identifies the vocoder, namely the vocoder in the wireless terminal 100. The identification is effected by a database search operation, as it will be described hereafter.

b) the signaling and control processor 210 examines the data frames received from the signaling and control processor 112 and converted by the vocoder 114, and extracts any in-band signaling information. This is effected by observing the bit values at the predetermined locations in the data frame. If the in-band message is a vocoder identifier, a database (not shown in the drawings) is consulted to determine the type of vocoder issuing the message. Depending upon the contents of the message, the following possibilities arise:

1) if the signaling and control processor 210 has determined that the base station 110 is not "bypass" capable, or that it has not been able to determine it yet, or that the originating terminal simply is not equipped with a vocoder (i.e. it is a wireline terminal), it will leave the switch mechanism 250 in its position and convert PCM speech 316, received from the base station 110 or the PSTN 140, to compressed speech with one of the vocoders which has been chosen as described earlier ("user preferred" or default");

2) if the signaling and control processor 210, has identified that the base station 110 is "bypass" capable, the identifier of the vocoder is verified in the local database to determine the originating vocoder type, namely the vocoder in the wireless terminal 100. If:

i) the voice storage and forwarding device 200 has an identical vocoder, in other words the vocoder in the wireless terminal 100 operates according to the same frame format or standard as one of the vocoders linked to the voice storage and forwarding device 200, the signaling and control processor 210 sends a message to the signaling and control processor 112 which causes both switches 116 and 250 to adopt the "bypass" position 314 at the same time. Thus, any compressed speech data received from the wireless terminal 100 will be directed to the message database 230 without decoding. This mode of operation is the one that allows achieving the best possible voice quality since no vocoder tandeming occurs; or ii) the voice storage and forwarding device 200 does not have an identical vocoder, then the signaling and control processor 210 will leave the switch mechanism 250 in its position and convert PCM speech 316, received from the base station 110, to compressed speech with one of the vocoders which has been chosen as described earlier ("user preferred" or default").

Once the signaling and control processor 210 has determined the switch mechanism 250 selection, it will send a signal to the tagging means 220 that will instruct it to attach a vocoder type designator 318. This will be done for each data frame. The tagging means is any agency that is capable of generating an identification code, constituting a vocoder type designated that identifies the type of vocoder which was used to compress the speech signal. The compressed speech data frame can now be stored 320 in the message database 230.

The last step is to determine, through signaling and control, if the communication is finished 322. If the communication is not finished, the signaling and control processor 210 will get a new speech frames (PCM or compressed) and process it as described above.

Figure 4:
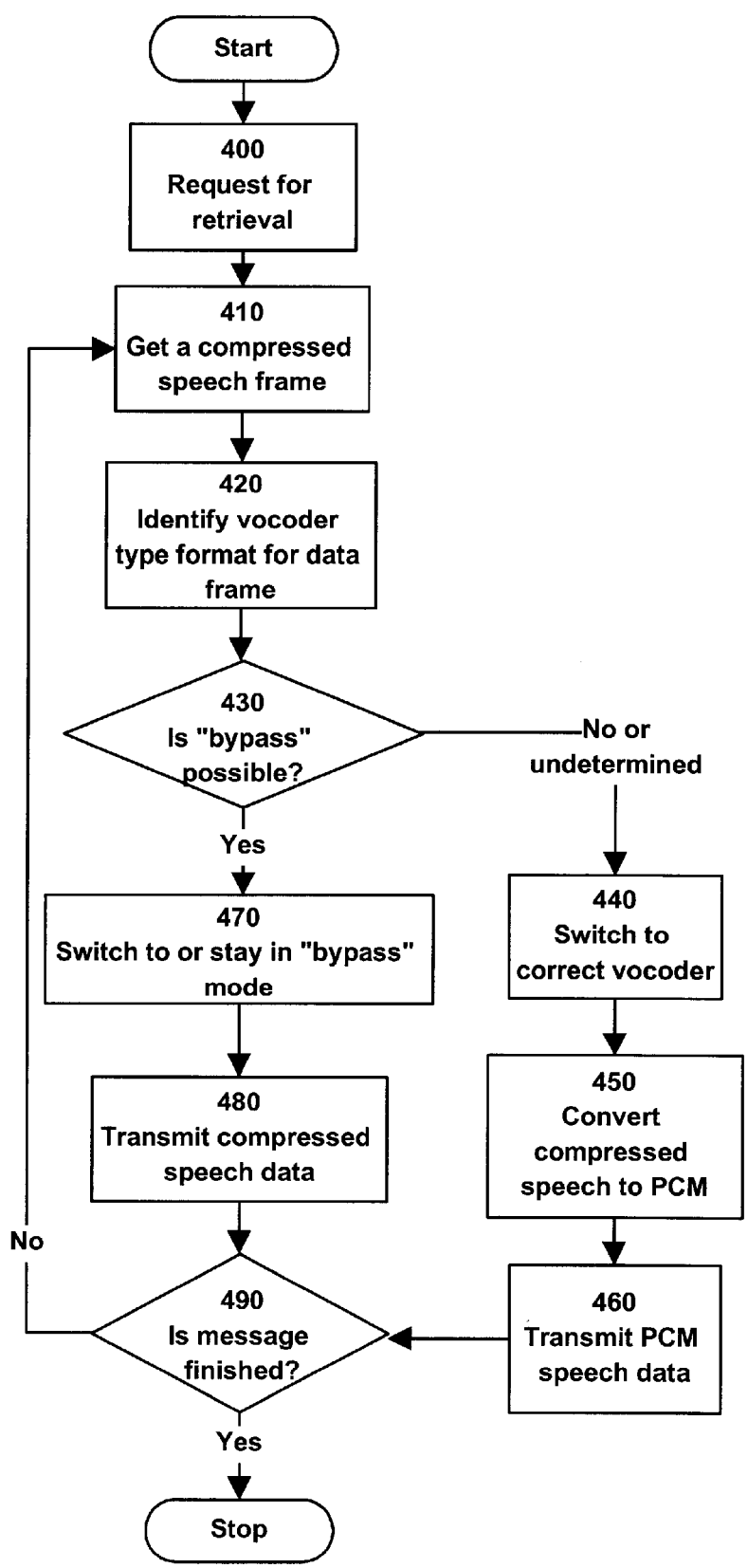
FIG. 4 is a flow chart describing the procedure for retrieving a message from the voice storage and forwarding device in accordance with the invention.

FIG. 4 is a flow chart describing the procedure that is followed by the voice storage and forwarding device 200 when a message is to be retrieved from the message database 230.

A caller first makes a request for retrieval 400 by accessing the voice storage and forwarding device 200 via a remote terminal (wireless 100 or wireline 150). The signaling and control processors 112 and 210 exchange the necessary information in order to get a first compressed speech frame 410 from the message database 230.

The voice storage and forwarding device 200 will identify, through the tagging means 220, the vocoder type format for the speech frame 420. It will then go through the "bypass" capability determination loop 430. For the first few frames, the system will not be ready to use the "bypass" mode since the inband communication channel will not have been established yet. "Bypass" not being possible, the tagging means 220 that first receives the data frame from the message database, will extract the vocoders type designated data associated with the data frame, and issue a signal to the signaling and control processor 210 to set 440 the switch mechanism 250 to the vocoder selection position identified by the vocoder type designator such that the compressed speech frame may be converted to PCM 450 with the one of the vocoder 240 to 248. The PCM data will then be transmitted 460 to the base station 110.

For the frames following the first few, it may be determined (as described in detail below) that "bypass" is possible. A signal will be issued to the signaling and control processor 210 to set 470 the switch mechanism 250 to the "bypass" position such that any compressed speech data retrieved from the message database 230 will be directed to the retrieving wireless terminal 100 without decompression 480. This mode of operation is the one that allows achieving the best possible voice quality since no vocoder tandeming occurs.

For the "bypass" capability determination when in message retrieval mode, the handshaking procedure between the voice storage and forwarding device 200 and the base station 110 involves the exchange of different messages such that every unit can be set in a mode allowing to produce the best possible speech quality. The handshaking procedure involves the exchange of the following messages:

a) the signaling and control processor 210 embeds an identifier in the PCM speech signal issued by one of its vocoders 240 to 248. This identifier enables any base station 110 to precisely determine the compressed speech format in which the data was stored. The identification is effected by a database seeking operation, as it will be described hereafter.

b) if a wireline terminal is retrieving the message, there will be no handshaking procedure since the speech data will not pass through a base station. The voice storage and forwarding device 200 will simply convert 450 the compressed speech data from its message database 230, using the proper vocoder 240 to 248, and send 460 the PCM speech data to the wireline terminal 150 through the PSTN 140;

c) if the message is being retrieved by a wireless terminal and base station 110 is not "bypass" capable, the signaling and control data which was attached to the speech data will simply be ignored and there will be no handshaking procedure. The voice storage and forwarding device 200 will continue the retrieval of data frames and their conversion 450, in the proper vocoder 240 to 248, from compressed speech data to PCM speech data and the vocoder 114 of base station 110 will then be used to convert PCM speech data to compressed speech data; or d) if the message is being retrieved by a wireless terminal 100 and base station 110 is "bypass" capable, the signaling and control processor 112 examines the data frames received from the signaling and control processor 210, and converted by one of the vocoders 240 to 242, and extracts any in-band signaling information. This is effected by observing the bit values at the predetermined locations in the data frame. If the in-band message is a vocoder identifier, a database (not shown in the drawings) is consulted to determine the type of vocoder connected to the vocoder issuing the message. Depending upon the contents of the message, the following possibilities arise:

1) if the wireless terminal 100 retrieving the message has an identical vocoder, in other words the vocoder in the wireless terminal 100 operates according to the same frame format or standard as the one for the vocoder which was used to store the data in the message database 230, the signaling and control processor 112 sends a message to the signaling and control processor 210 which causes both switches 250 and 116 to adopt the "bypass" position at the same time 470. Thus, any compressed speech data retrieved from the message database 230 will be directed to the retrieving wireless terminal 100 without decompression 480. This mode of operation is the one that allows achieving the best possible voice quality since no vocoder tandeming occurs; or 2) if the wireless terminal 100 retrieving the message does not have an identical vocoder, then the signaling and control processor 112 will leave the switch 116 in its position and convert PCM speech received from the voice storage and forwarding device 200 to compressed speech with its own vocoder and switch mechanism 250 will also be left in the position which the tagging means 220 has determined 420 and it will convert compressed speech to PCM 450 using one of its vocoders.

The last step of the message retrieval procedure is to determine if the message is finished 490. If the message is not finished, the signaling and control processor 210 will get a new speech frames 400 (PCM or compressed) and process it as described above.

Figure 5:
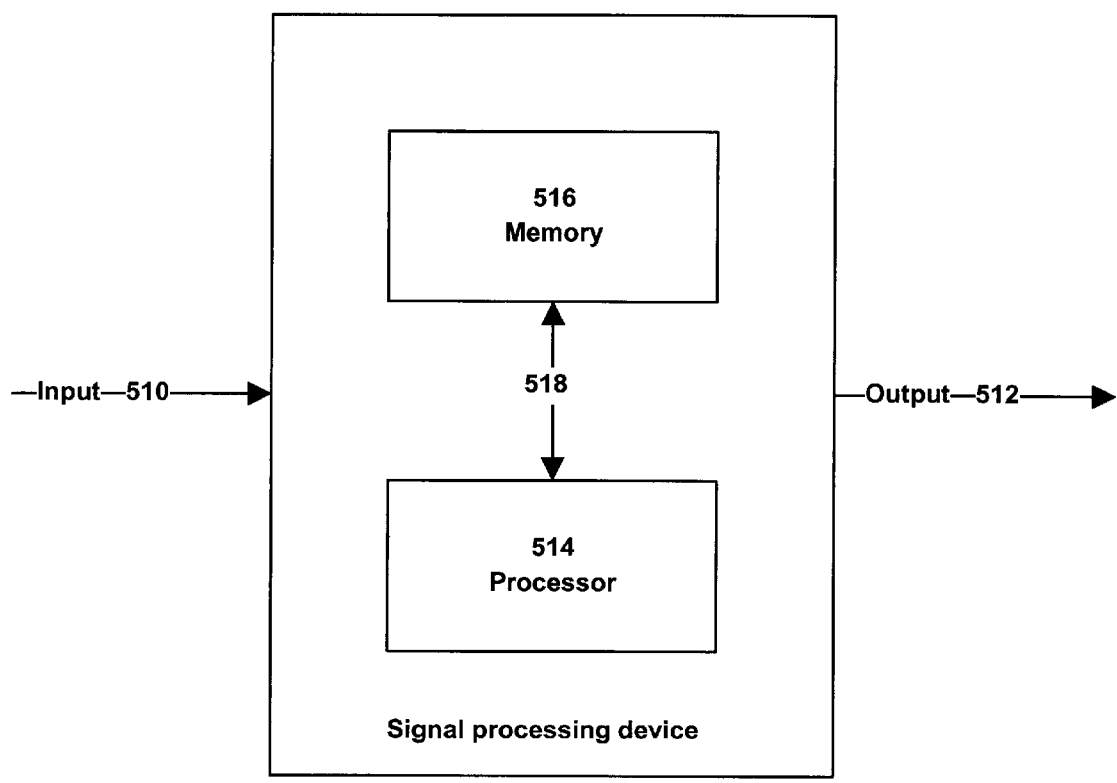
FIG. 5 is a block diagram of a signal processing device for implementing the procedures depicted in FIGS. 3 and 4.

From a structural point of view, the apparatus illustrated at FIG. 5 can be used to implement the function of a the new voice storage and forwarding device 200 whose operation was detailed above in connection with FIGS. 3 and 4. The apparatus comprises an input signal line 510, a signal output line 512, a processor 514 and a memory 516. The memory 516 is used for storing instructions for the operation of the processor 514 and also for storing the data used by the processor 514 in executing those instructions. A bus 518 is provided for the exchange of information between the memory 516 and the processor 514.

The instructions stored in the memory 516 allow the apparatus to operate according to block 200 of the functional block diagram illustrated at FIG. 2.

The above description of a preferred embodiment should not be interpreted in any limiting manner since variations and refinements can be made without departing from the spirit of the invention. The scope of the invention is defined in the appended claims and their equivalents.

We claim:

1. A voice storage and forwarding device, comprising:
   an input for receiving a digital signal that conveys audio information;
   a group of vocoders, each vocoder including an encoder stage capable of compressing the digital signal that conveys audio information in at least one data frame;
   a switch capable of acquiring a plurality of vocoder selection positions, in each vocoder selection position said switch directing the digital signal that conveys audio information received at said input to a selected one of said vocoders of said group of vocoders;
   a tagging unit capable of generating a vocoder type designator for association with a data frame issued by the encoder stage of a given vocoder of said group of vocoders, said vocoder type designator capable of uniquely identifying the given vocoder amongst the vocoders in said group of vocoders;
   a storage medium in a data communicative relationship with said vocoders, said storage medium capable to store data that conveys audio information issued by a vocoder from said group of vocoders and transmit stored data that conveys audio information toward a selected one of said vocoders.

2. A voice storage and forwarding device as defined in claim 1, wherein the encoder stage of each vocoder is capable of compressing the audio information in at least one data frame of a format different from a format of a data frame issued by any other vocoder of said group of vocoders.

3. A voice storage and forwarding device as defined in claim 1, wherein each vocoder includes an encoder stage capable of compressing the digital signal that conveys audio information in at least one data frame including an excitation segment and a coefficients segment.

4. A voice storage and forwarding device as defined in claim 1, wherein said storage medium is capable of forwarding a data frame stored on said storage medium to a selected vocoder from said group of vocoders.

5. A voice storage and forwarding device as defined in claim 4, wherein said switch is responsive to a vocoder type designator associated to a data frame stored on said storage medium to acquire a vocoder selector position to select a vocoder in said group of vocoders to which the data frame stored on said storage medium will be forwarded.

6. A voice storage and forwarding device as defined in claim 5, wherein each vocoder from said group of vocoders includes a decoder stage, a data frame issued by said storage medium and forwarded to the decoder stage of a selected vocoder being decompressed by the decoder stage of the selected vocoder.

7. A voice storage and forwarding device as defined in claim 1, wherein said switch is responsive to control information generated in a course of a given message recording transaction, to acquire a vocoder selector position indicated by the control information.

8. A voice storage and forwarding device as defined in claim 1, wherein said switch is capable of acquiring a bypass operative position, in said bypass operative position, said switch transferring a data frame including an excitation segment and a coefficients segment impressed at said input to said storage medium for storage of the data frame thereon.

9. A voice storage and forwarding device as defined in claim 8, wherein said switch is capable acquiring either one of a vocoder selector position and said bypass position in dependence of control data forwarded at said input.

10. A communication system, comprising:
    a database storing a plurality of vocoder type identifiers;
    a voice storage and forwarding device;
    a data transmission pathway between said database and said voice storage and forwarding device, said voice storage and forwarding device including:
    a) an input for receiving a digital signal that conveys audio information;
    b) a group of vocoders, each vocoder including an encoder stage capable of compressing the digital signal that conveys audio information in at least one data frame;
    c) a switch capable of acquiring a plurality of vocoder selection positions, in each vocoder selection position said switch directing the digital signal that conveys audio information received at said input to a selected one of said vocoders of said group of vocoders, said switch being responsive to a vocoder type identifier received from said database over said data transmission pathway to acquire a vocoder selection position;
    d) a tagging unit capable of generating a vocoder type designator for association with a data frame issued by the encoder stage of a given vocoder of said group of vocoders, said vocoder type designator capable of uniquely identifying the given vocoder amongst the vocoders in said group of vocoders;
    e) a storage medium in a data communicative relationship with said vocoders, said storage medium capable to store data that conveys audio information issued by a vocoder from said group of vocoders and transmit stored data that conveys audio information toward a selected one of said vocoders.

11. A communication system as defined in claim 10, wherein each vocoder includes an encoder stage capable of compressing the digital signal that conveys audio information in at least one data frame including an excitation segment and a coefficients segment.

12. A communication system as defined in claim 11, wherein the encoder stage of each vocoder is capable of compressing the audio information in at least one data frame of a format different from a format of a data frame issued by any other vocoder of said group of vocoders.

13. A communication system as defined in claim 10, wherein said storage medium is capable of forwarding a data frame stored on said storage medium to a selected vocoder from said group of vocoders.

14. A communication system as defined in claim 13, wherein said switch is responsive to a vocoder type designator associated to a data frame stored on said storage medium to acquire a vocoder selector position to select a vocoder in said group of vocoders to which the data frame stored on said storage medium will be forwarded.

15. A communication system as defined in claim 14, wherein each vocoder from said group of vocoders includes a decoder stage, a data frame issued by said storage medium and forwarded to the decoder stage of a selected vocoder being decompressed by the decoder stage of the selected vocoder.

16. A communication system as defined in claim 10, wherein said switch is capable of acquiring a bypass operative position, in said bypass operative position, said switch transferring a data frame including an excitation segment and a coefficients segment impressed at said input to said storage medium for storage of the data frame thereon.

17. A communication system as defined in claim 16, wherein said switch is capable acquiring either one of a vocoder selector position and said bypass position in dependence of control data forwarded at said input.

18. A voice storage and forwarding device, comprising:
   an input for receiving an audio data signal that conveys speech sound information, the audio data signal being in either one of a first format and a second format;
   at least one vocoder;
   a switch capable of acquiring at least two operative positions, namely a vocoder selection position and a bypass position, in said vocoder selection position said switch directing the audio data signal received at said input in the first format to said vocoder for conversion of the audio data signal from the first format to the second format;
   a storage medium in a data communicative relationship with said vocoder and with said switch, said storage medium capable to store audio data signals in the second format issued by said vocoder and transmit stored audio data signals in the second format toward said vocoder;
   in said bypass position said switch bypassing said vocoder and directing the audio data signal received at said input in the second format toward said storage medium.

19. A voice storage and forwarding device as defined in claim 18, wherein said switch is responsive to a control message received at said input to acquire said bypass position.

20. A voice storage and forwarding device as defined in claim 19, wherein said control message is transmitted via inband signaling.

21. A voice storage and forwarding device as defined in claim 20, wherein said control message includes a portion identifying a source of said control message.

22. A voice storage and forwarding device as defined in claim 21, wherein said switch is capable of issuing via in-band signaling in response to said control message an acknowledgement message.

23. A voice storage and forwarding device as defined in claim 22, wherein said acknowledgement message includes a portion identifying said switch.

24. A voice storage and forwarding device as defined in claim 21, wherein said switch in the absence of control message assumes said vocoder selector position.

25. A voice storage and forwarding device as defined in claim 19, wherein said voice and forwarding device comprises:
   a group of vocoders;
   a switch capable of acquiring a plurality of vocoder selection positions, in each vocoder selection position said switch directing the digital signal that conveys audio information received at said input to a selected one of said vocoders of said group of vocoders.

26. A voice storage and forwarding device as defined in claim 25, wherein each vocoder includes an encoder stage capable of compressing the digital signal that conveys audio information in at least one data frame including an excitation segment and a coefficients segment.

27. A voice storage and forwarding device as defined in claim 26, wherein the encoder stage of each vocoder is capable of compressing the audio information in at least one data frame of a format different from a format of a data frame issued by any other vocoder of said group of vocoders.

28. A voice storage and forwarding device as defined in claim 25, comprising a tagging means capable of generating a vocoder type designate or for association with a data frame issued by the encoder stage of a given vocoder of said group of vocoders, said vocoder type designator capable of uniquely identifying the given vocoder amongst the vocoders in said group of vocoders.

29. A voice storage and forwarding device as defined in claim 28, wherein said storage medium is capable of forwarding a data frame stored on said storage medium to a selected vocoder from said group of vocoders.

30. A voice storage and forwarding device as defined in claim 29, wherein said switch is responsive to a vocoder type designator associated to a data frame stored on said storage medium to acquire a vocoder selector position to select a vocoder in said group of vocoders to which the data frame stored on said storage medium will be forwarded.

31. A voice storage and forwarding device as defined in claim 30, wherein each vocoder from said group of vocoders includes a decoder stage, a data frame issued by said storage medium and forwarded to the decoder stage of a selected vocoder being decompressed by the decoder stage of the selected vocoder.

32. A voice storage and forwarding device as defined in claim 31, wherein said switch is responsive to control information generated in a course of a given message recording transaction, to acquire a vocoder selector position indicated by the control information.

33. A voice storage and forwarding device as defined in claim 18, wherein said second format is a compressed version of the audio data signal in the first format.

34. A voice storage and forwarding device as defined in claim 18, wherein said second format is an encoded version of the audio data signal in the first format.

35. A voice storage and forwarding device as defined in claim 18, wherein when in said first format, the audio data signal is in PCM format.

36. A communication system, comprising:
   a base station or base station controller including a digital signal processor;
   a voice storage and forwarding device;
   a data transmission pathway between said base station and said voice storage and forwarding device, said voice storage and forwarding device including:
   a) an input for receiving an audio data signal that conveys speech sound information, the audio data signal being in either one of a first format and a second format;
   b) at least one vocoder;
   c) a switch capable of acquiring at least two operative positions, namely a vocoder selection position and a bypass position, in said vocoder selection position said switch directing the audio data signal received at said input in the first format to said vocoder for conversion of the audio data signal from the first format to the second format;
   d) a storage medium in a data communicative relationship with said vocoder and with said switch, said storage medium capable to store audio data signals in the second format issued by said vocoder and transmit stored audio data signals in the second format toward said vocoder;

e) in said bypass position said switch bypassing said vocoder and directing the audio data signal received at said input in the second format toward said storage medium;

f) said switch operative to acquire said bypass position in response to a control message received from said digital signal processor over said data transmission pathway.

37. A communication system as defined in claim 36, wherein said control message includes a portion identifying said digital signal processor.

38. A communication system as defined in claim 37, wherein said switch is capable of issuing via inband signaling in response to said control message an acknowledgement message.

39. A communication system as defined in claim 38, wherein said acknowledgement message includes a portion identifying said switch.

40. A communication system as defined in claim 39, wherein said switch in the absence of control message assumes said vocoder selector position.

41. A communication system as defined in claim 36, wherein said second format is a compressed version of the audio data signal in the first format.

42. A communication system as defined in claim 36, wherein said second format is an encoded version of the audio data signal in the first format.

43. A communication system as defined in claim 36, wherein when in said first format, the audio data signal is in PCM format.

44. A method for storing audio data containing speech sound information, the audio data being in either one of a first format and a second format, said method comprising the steps of:

providing a vocoder;

providing a switch capable of acquiring either one of a vocoder selection position and a bypass position, in said vocoder selection position said switch directing audio data in the first format to said vocoder for conversion of the audio data from the first format to a second format;

providing a storage medium in a data communicative relationship with said vocoder, said storage medium capable to store audio data in the second format issued by said vocoder;

in said bypass position said switch bypassing said vocoder and directing audio data in the second format toward said storage medium;

setting said switch to a selected one of the vocoder selection position and the bypass position to permit transfer of audio data to said storage device.

45. A method as defined in claim 44, comprising the step of setting said switch to said bypass position in response of reception by said switch of a control message.

46. A method as defined in claim 45, wherein said control message is transmitted to said switch by in-band signaling.

47. A method as defined in claim 46, wherein said control message includes a portion identifying a source of said message.

48. A method as defined in claim 47, comprises the step of issuing an acknowledgement message in response to said control message.

* * * * *